(12) United States Patent
Shinkawa et al.

(10) Patent No.: US 11,336,345 B2
(45) Date of Patent: May 17, 2022

(54) SIGNAL TRANSMISSION DEVICE

(71) Applicant: Yamaha Corporation, Hamamatsu (JP)

(72) Inventors: Tomohiro Shinkawa, Hamamatsu (JP);
Hirokazu Suzuki, Hamamatsu (JP);
Toshiyuki Sugawara, Kakegawa (JP)

(73) Assignee: Yamaha Corporation, Hamamatsu (JP)

( * ) Notice: Subject to any disclaimer, the term of this patent is extended or adjusted under 35 U.S.C. 154(b) by 0 days.

(21) Appl. No.: 16/999,628

(22) Filed: Aug. 21, 2020

(65) Prior Publication Data
US 2021/0058122 A1 Feb. 25, 2021

(30) Foreign Application Priority Data
Aug. 22, 2019 (JP) .............................. JP2019-151946

(51) Int. Cl.
| | |
|---|---|
| *H04B 7/06* | (2006.01) |
| *H01Q 1/12* | (2006.01) |
| *H01Q 3/30* | (2006.01) |
| *H04W 16/28* | (2009.01) |

(52) U.S. Cl.
CPC ............ *H04B 7/06* (2013.01); *H01Q 1/1271* (2013.01); *H01Q 3/30* (2013.01); *H04W 16/28* (2013.01)

(58) Field of Classification Search
CPC .......... H01Q 1/1271; H01Q 3/30; H04B 7/06; H04W 16/28
USPC ................................................ 375/295–297
See application file for complete search history.

(56) References Cited

U.S. PATENT DOCUMENTS

| | | | | |
|---|---|---|---|---|
| 6,826,234 | B1* | 11/2004 | Shoji ..................... | H04B 1/24 |
| | | | | 375/259 |
| 10,153,845 | B2* | 12/2018 | Ashrafi .................. | H04L 63/06 |
| 10,277,331 | B1* | 4/2019 | Au ....................... | H04B 10/1143 |
| 2002/0044095 | A1* | 4/2002 | Noro ..................... | H01Q 1/32 |
| | | | | 343/713 |
| 2009/0071952 | A1* | 3/2009 | Kuwabara ............ | H05B 1/0233 |
| | | | | 219/494 |
| 2012/0068964 | A1* | 3/2012 | Wright ................. | G06F 3/03545 |
| | | | | 345/174 |
| 2014/0252876 | A1* | 9/2014 | Riezebos ............. | H01R 13/6691 |
| | | | | 307/104 |
| 2019/0165486 | A1* | 5/2019 | Yoshida ................ | H01Q 1/245 |
| 2019/0252758 | A1* | 8/2019 | Funatsu ................ | H01Q 1/50 |
| 2019/0312334 | A1* | 10/2019 | Shin ..................... | H01Q 9/0407 |
| 2019/0372213 | A1* | 12/2019 | Hashimoto ............ | H01Q 1/52 |
| 2020/0110049 | A1* | 4/2020 | Lee ...................... | G01N 33/02 |
| 2020/0410812 | A1* | 12/2020 | Jones ................... | H04B 5/0037 |
| 2021/0333679 | A1* | 10/2021 | Phillips ................ | H04B 10/807 |

FOREIGN PATENT DOCUMENTS

JP 2012-99995 A 5/2012

* cited by examiner

*Primary Examiner* — Emmanuel Bayard
(74) *Attorney, Agent, or Firm* — Crowell & Moring LLP (57) ABSTRACT

A signal transmission device includes a first antenna, a second antenna, a demodulation device, and a fixing member. The first antenna transmits radio waves containing a signal modulated at a first frequency. The second antenna receives the radio waves containing the signal via a medium. The demodulation device demodulates the signal and connected to the second antenna. The fixing member fixes the first antenna and the second antenna to the medium.

17 Claims, 9 Drawing Sheets

SIGNAL TRANSMISSION DEVICE

CROSS REFERENCE TO RELATED APPLICATIONS

This application is based on and claims the benefit of priority from the prior Japanese Patent Application No. 2019-151946, filed on Aug. 22, 2019, the entire contents of which are incorporated herein by reference.

FIELD

The present invention relates to a signal transmission device and, in particular, to a device for transmitting a signal from the outside to the inside of a building or a movable body.

BACKGROUND

In recent years, along with the popularization of mobile terminals such as mobile phones and tablet terminals, it has been important to ensure a wireless communication environment for data communication. In particular, there has been a case where radio waves hardly reach the inside (or interior) of a building or the like, due to blockage by a building or the like that is higher than a base station. To improve such a situation, a known technology makes it possible to transmit and receive radio waves by imparting an antenna function to a windowpane of a building.

SUMMARY

In an aspect of the present invention, a signal transmission device includes: a first antenna transmitting radio waves containing a signal modulated at a first frequency; a second antenna receiving the radio waves containing the signal via a medium; a demodulation device demodulating the signal and connected to the second antenna; and a fixing member fixing the first antenna and the second antenna to the medium.

In an aspect of the present invention, a signal transmission device includes: an antenna receiving radio waves containing a signal modulated at a first frequency; a first electrode connected to the antenna; a second electrode; a demodulation device demodulating the signal and connected to the second electrode; and a fixing member fixing the first electrode and the second electrode to a medium.

In an aspect of the present invention, a windowpane includes; a first antenna receiving radio waves containing a signal modulated at a first frequency on a first surface; a first electrode connected to the first antenna on the first surface; and a second electrode facing the first electrode on a second surface opposite to the first surface.

In an aspect of the present invention, a signal transmission method includes: transmitting radio waves containing a signal modulated at a first frequency toward an inside of a building or a movable body using a first antenna fixed to an outside of the building or the movable body; receiving, via a medium, the radio waves transmitted from first antenna, using a second antenna fixed to the inside of the building or the movable body; and demodulating the radio waves received by the second antenna, using a demodulation device connected to the second antenna.

In an aspect of the present invention, a signal transmission method includes: receiving radio waves containing a signal modulated at a first frequency using an antenna; transmitting the radio waves received by the antenna to an inside of a building or a movable body via a medium using a capacitor constituted by a first electrode fixed to an outside of the building or the movable body and a second electrode fixed to the inside of the building or the movable body; and demodulating the signal using a demodulation device connected to the second electrode.

An aspect of the present invention makes it possible to provide a stable wireless communication environment inside a building or a movable body by means of a simple configuration. Other aspects, objects, advantages and novel features of the present invention will become apparent from the following detailed description of one or more preferred embodiments when considered in conjunction with the accompanying drawings, in which:

DESCRIPTION OF EMBODIMENTS

In existing technology, a pair of panes of glass constituting double-glazed glass is provided with slot antennas. Each of the slot antennas is connected to the other via a relay device. Accordingly, in order to utilize the existing technology, it is necessary to install dedicated double-glazed glass and a relay device in a building. Therefore, it has undesirably been difficult to introduce the technology into an ordinary household.

In particular, in recent years, 5G (fifth-generation mobile communication system), which is a next-generation telecommunications standard, has been intended to utilize radio waves of a high-frequency band including millimeter waves. Radio waves for use in 5G highly tend to travel in a direct path and undesirably more hardly reach due to blockage by high-rise buildings than conventional radio waves. Furthermore, since radio waves of a high-frequency band are short in wavelength, they are undesirably attenuated or reflected by non-metal portions (e.g. windowpanes) of buildings.

Accordingly, for compatibility with 5G, which will become widely used in the future, it is urgent to ensure a stable wireless communication environment inside a building or a movable body such as a vehicle.

It is an object of the present invention to provide a stable wireless communication environment inside a building or a movable body by means of a simple configuration.

In the following, embodiments of the present invention are described in detail with reference to the drawings. The following embodiments are examples of embodiments of the present invention, and the present invention should not be construed within the limitations of these embodiments. In the drawings that are referred to in the present embodiments, components having the same or similar functions are given the same or similar reference signs, and in some cases, a description of such components is omitted. Further, for convenience of explanation, scale ratios of the drawings may be different from actual scale ratios, and some of the components may be omitted from the drawings.

Figure 1:
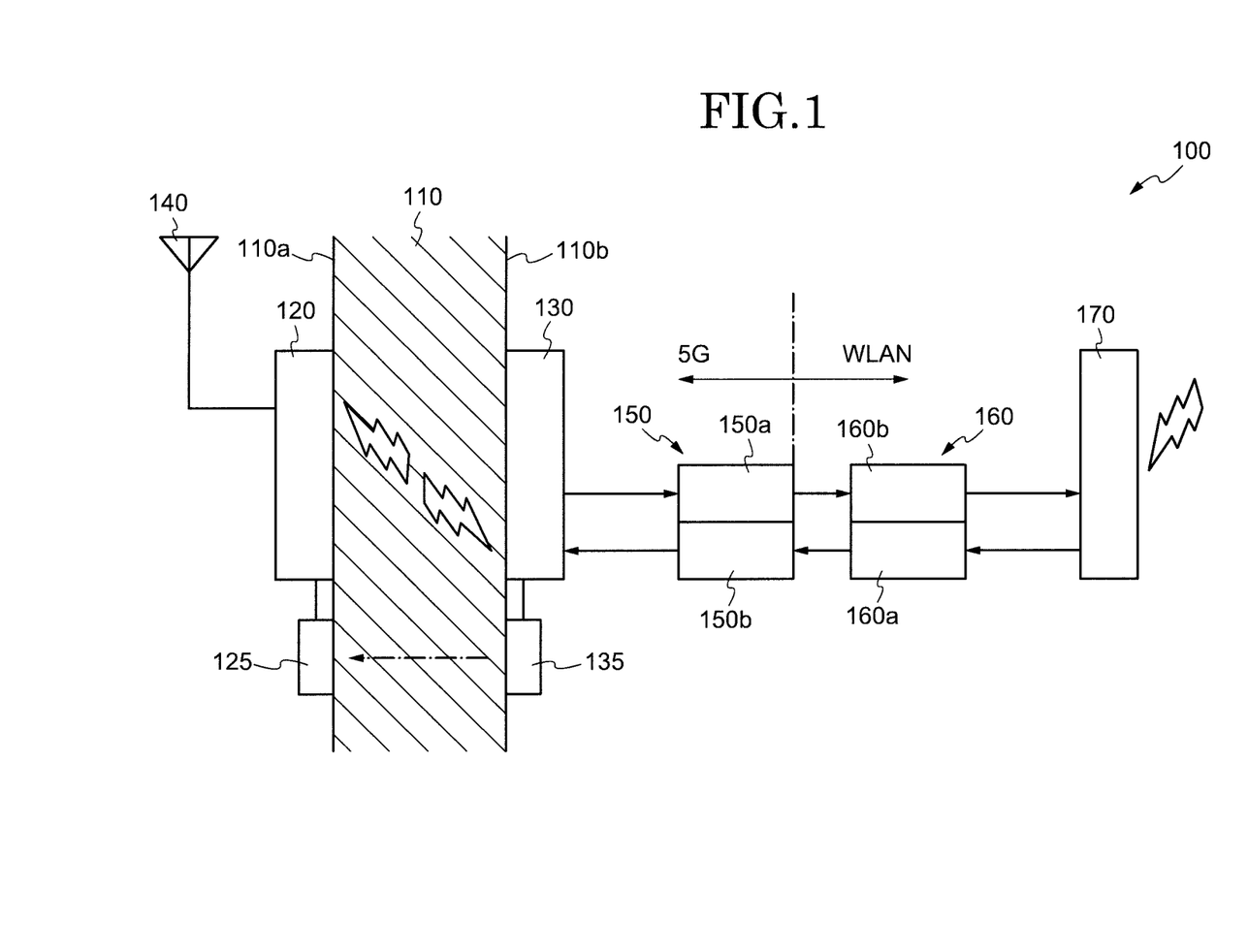
FIG. 1 is a diagram showing a configuration of a signal transmission device.

FIG. 1 is a diagram showing a configuration of a signal transmission device 100. The signal transmission device 100 of the present embodiment is fitted to a medium (non-metal portion) such as a wall, a roof, a windowpane, or the like of a building. The signal transmission device 100 has a function of transmitting, to the inside of a building, a signal contained in radio waves received outside the building. The signal transmission device 100 of the present embodiment is an example of a device that transmits radio waves for use in 5G to the inside of a building. Accordingly, the after-mentioned first, second, and third antennas 120, 130, and 140 are each capable of transmitting and receiving radio waves of high frequencies of not lower than several gigahertz. Examples of radio waves of such high frequencies include millimeter waves.

As shown in FIG. 1, the first antenna 120 is fixed to a first surface 110a of a windowpane 110 of a building. The building is for example a house. The first surface 110a is a surface of the building that faces outward. The second antenna 130 is fixed to a second surface (surface of the building that faces inward) 110b of the windowpane 110 opposite to the first surface 110a. The first antenna 120 and the second antenna 130 are fixed face-to-face to each other via the windowpane 110, which serves as a dielectric. In the present embodiment, the first antenna 120 and the second antenna 130 transmit and receive, to and from each other, radio waves containing a signal modulated at a first frequency. The first frequency is for example 28 GHz.

The present embodiment uses directional antennas as the first antenna 120 and the second antenna 130. A directional antenna is an antenna that emits radio waves in a controllable direction and at a controllable intensity. Using a directional antenna makes it possible, for example, to intensely emit radio waves in a particular direction. Usable examples of such directional antennas include array antennas. An array antenna is an antenna having a plurality of antenna elements regularly arrayed. The antenna directivity of a directional antenna can be controlled by electrically controlling the amplitude and phase of each antenna element.

Specifically, in the present embodiment, the first antenna 120 and the second antenna 130 are phased-array antennas. The use of the phase-array antennas makes it possible to transmit and receive radio waves by beamforming between the first antenna 120 and the second antenna 130. In this case, the first antenna 120 and the second antenna 130 can transmit and receive radio waves to and from each other by setting optimum directivities. In this way, the use of directional antennas makes satisfactory signal transmission possible even if they are somehow displaced with respect to each other, as optimum directivities can be set between the antennas.

The first antenna 120 and the second antenna 130 can be fixed to the windowpane 110 with fixing members such as adhesives, pressure-sensitive adhesives, or magnets. The signal transmission device 100 of the present embodiment is intended to be fixed by a user him/herself in an ordinary household to a medium such as the windowpane 110 for use. Therefore, the signal transmission device 100 of the present embodiment is configured such that the first antenna 120 and the second antenna 130 can be fixed to the windowpane 110 with simple fixing members.

Figure 2A:
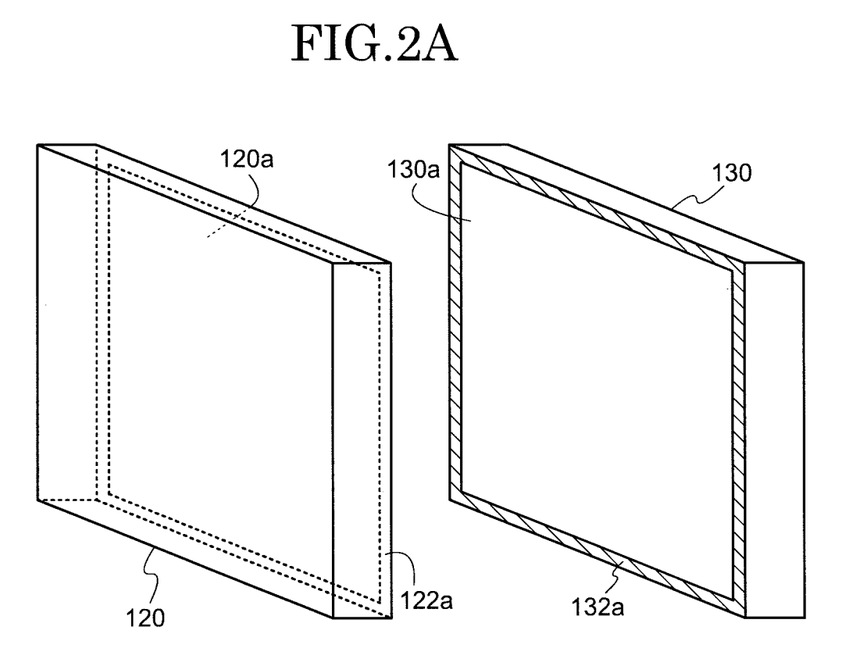
FIG. 2A is a diagram showing examples of fixing members for fixing a first antenna and a second antenna.
Figure 2B:
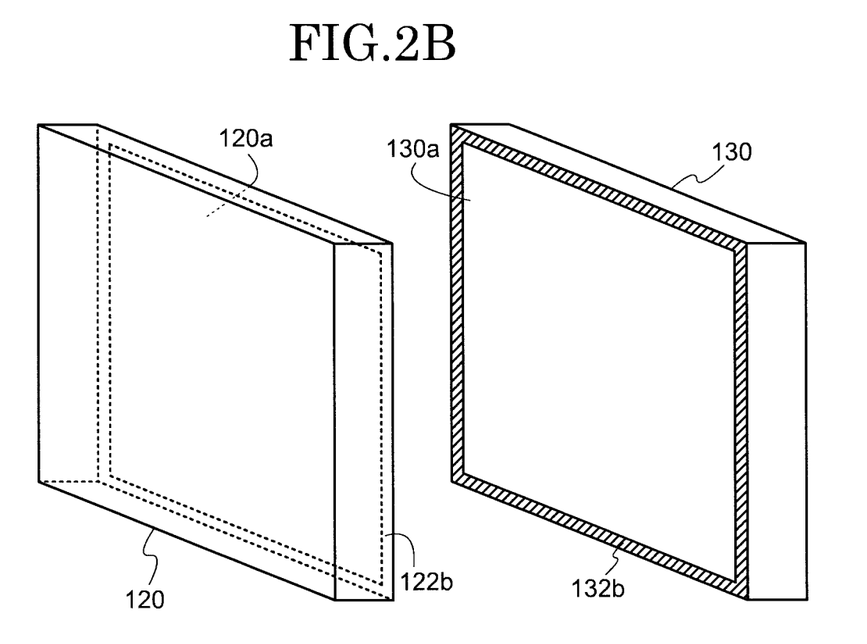
FIG. 2B is a diagram showing examples of fixing members for fixing the first antenna and the second antenna.

FIGS. 2A and 2B are diagrams each showing examples of fixing members for fixing the first antenna 120 and the second antenna 130. In FIG. 2A, a pressure-sensitive adhesive 122a is provided as a fixing member on a surface 120a of the first antenna 120 that faces the windowpane 110. The first antenna 120 has a plurality of antenna elements (not illustrated) arrayed on the surface 120a. Further, a pressure-sensitive adhesive 132a is provided as a fixing member on a surface 130a of the second antenna 130 that faces the windowpane 110. The second antenna 130, too, has a plurality of antenna elements (not illustrated) arrayed on the surface 130a.

The pressure-sensitive adhesives 122a and 132a may be provided in any form. For example, film pressure-sensitive adhesives may be used, or gel pressure-sensitive adhesives may be used. Thus, in the case of the present embodiment, the first antenna 120 and the second antenna 130 are fixed with the pressure-sensitive adhesives 122a and 132a, respectively. Therefore, the first antenna 120 and the second antenna 130 are easily attached to and detached from the windowpane 110. A "pressure-sensitive adhesive" is a fixing member that is lower in adhesive strength than an "adhesive" and can be attached to and detached from an adherend.

In the example shown in FIG. 2A, the first antenna 120 and the second antenna 130 can be fixed face-to-face to the windowpane 110 with the pressure-sensitive adhesives 122a and 132a, respectively. That is, the first antenna 120 and the second antenna 130 can be easily fixed to the windowpane 110 even without the use of a special tool or technique. In the present embodiment, the pressure-sensitive adhesives 122a and 132a are provided at outer edges of the surfaces 120a and 130a, respectively. However, this is not intended to impose any limitation, and the pressure-sensitive adhesives 122a and 132a may be provided in any position.

Further, in FIG. 2B, a magnet 122b is provided as a fixing member on the surface 120a of the first antenna 120. Further, a magnet 132b is provided as a fixing member on the surface 130a of the second antenna 130. At this point in time, the magnet 122b and the magnet 132b have magnetic forces of reversed polarity with each other. Accordingly, the magnet 122b and the magnet 132b cause the surface 120a and the surface 130a, respectively, to have such forces as to attract each other.

In the example shown in FIG. 2B, the magnetic forces of the magnets 122b and 132b allow the first antenna 120 and the second antenna 130 to be fixed in position. Therefore, the first antenna 120 and the second antenna 130 can be fixed in position simply by causing them to face each other via the windowpane 110. In the example shown in FIG. 2B, the use of the magnetic forces makes it easily to position the first antenna 120 and the second antenna 130. This allows a user to accurately position the antennas even without making a fine adjustment.

Next, as shown in FIG. 1, a first power supply device 125 is connected to the first antenna 120. The first power supply device 125 is fixed to the first surface 110a of the windowpane 110. A second power supply device 135 is connected to the second antenna 130. The second power supply device 135 is fixed to the second surface 110b of the windowpane 110. The first power supply device 125 and the second power supply device 135 function as power supplies for power supply electricity to the first antenna 120 and the second antenna 130, respectively. As indicated by a dot-and-dash arrow, the second power supply device 135 wirelessly feeds electricity to the first power supply device 125 via the windowpane 110. The first power supply device 125 and the second power supply device 135 need only be fixed to the windowpane 110 with fixing members such as adhesives, pressure-sensitive adhesive, or magnets.

A third antenna 140 is attached to the first antenna 120, which is located outside the building. The third antenna 140 has a role to receive radio waves in the air (radio waves containing a signal modulated at the first frequency) and transmit the signal to the first antenna 120. Further, the third antenna 140 has a role to output a signal transmitted from the first antenna 120 as radio waves into the air. A usable example of the third antenna 140 is a dipole antenna. However, without being limited to this, the third antenna 140 may be another type of antenna such as a microstrip antenna.

The second antenna 130 is connected to a first modulation and demodulation device 150. The first modulation and demodulation device 150 includes a first demodulation device 150a and a first modulation device 150b. The first demodulation device 150a demodulates a signal received from the second antenna 130 and thereby acquires the original signal (unmodulated signal). On the other hand, the first modulation device 150b modulates, at the first frequency, a signal received from the after-mentioned second demodulation device 160a. In this way, from the third antenna 140 to the first modulation and demodulation device 150, the signal transmission device 100 processes signals modulated at the first frequency.

Furthermore, the signal transmission device 100 includes a second modulation and demodulation device 160. The second modulation and demodulation device 160 includes the second demodulation device 160a and a second modulation device 160b. The second demodulation device 160a demodulates a signal received from a fourth antenna 170 and thereby acquires the original signal (unmodulated signal). On the other hand, the second modulation device 160b modulates, at a second frequency that is lower than the first frequency, a signal received from the first demodulation device 150a.

The second frequency is a frequency of several gigahertz (e.g. 2.4 GHz or 5 GHz) for use in a wireless LAN or the like that does not require a license. A possible example of the second modulation and demodulation device 160 is a modem, an optical network unit (ONU), or the like. Further, a possible example of the fourth antenna 170 is an antenna of a wireless LAN router or the like.

In this way, the present embodiment makes it possible to build an indoor wireless communication environment by down-converting radio waves of the first frequency to radio waves of the second frequency. On the other hand, radio waves received by the fourth antenna 170 are demodulated into the original signal by the second demodulation device 160a. The signal thus demodulated is converted by the first modulation device 150b to a signal modulated at the first frequency. That is, the present embodiment makes it possible to up-convert radio waves of the second frequency to radio waves of the first frequency for outdoor output.

Figure 3:
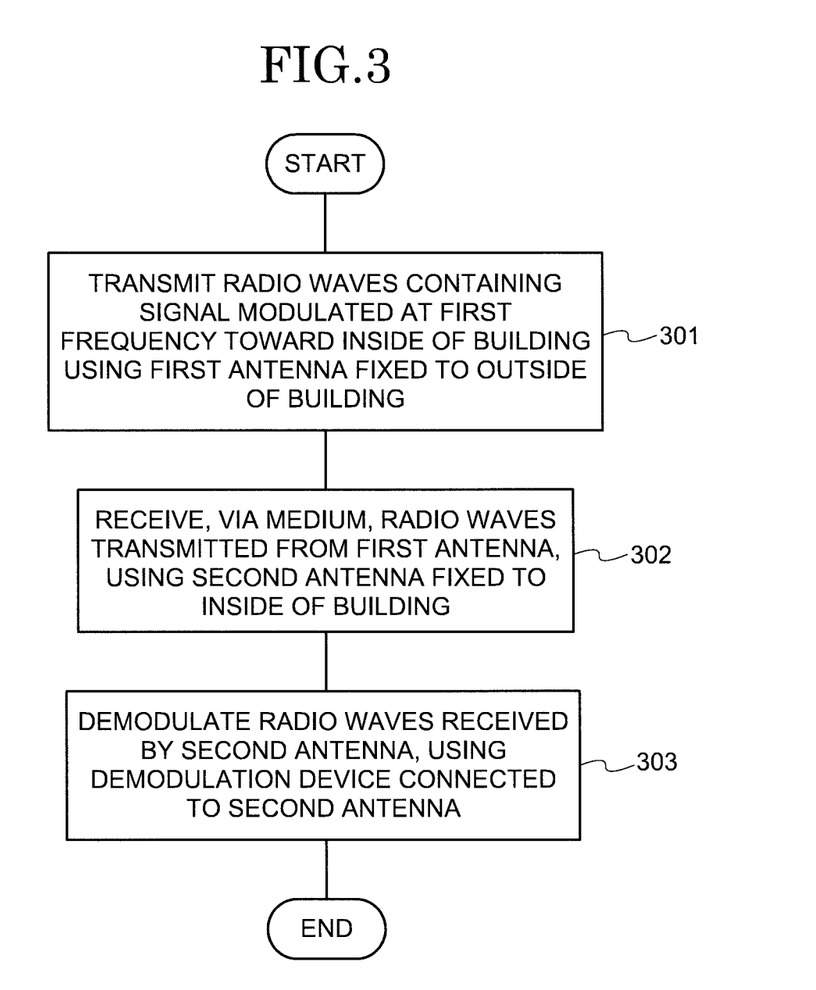
FIG. 3 is a flow chart showing a configuration of a signal transmission method.

A signal transmission method involving the use of the signal transmission device 100 of the present embodiment is described here with reference to FIG. 3.

FIG. 3 is a flow chart showing a configuration of a signal transmission method. First, the third antenna 140 receives radio waves containing a signal modulated at the first frequency. The signal received by the third antenna 140 is transmitted to the first antenna 120, which is fixed to the outside of the building. The first antenna 120 transmits, toward the inside of the building, radio waves containing the signal thus received (S301).

The second antenna 130, which is fixed to the inside of the building, receives via the windowpane 110 the radio waves transmitted from the first antenna 120 (S302). Thus, in the present embodiment, radio waves are transmitted and received via the windowpane 110 using the first antenna 120 and the second antenna 130. Accordingly, radio waves for use in 5G received outside the building can be transmitted to the inside of the building.

The signal received by the second antenna 130 is transmitted to the first demodulation device 150a connected to the second antenna 130. The first demodulation device 150a demodulates the signal thus received and thereby extracts the original signal (S303). Through these steps, radio waves for use in 5G can be transmitted to the inside of the building and the original signal contained in the radio waves can be obtained.

The signal thus demodulated is transmitted to the second modulation device 160b connected to the first demodulation device 150a, and is modulated at the second frequency, which is lower than the first frequency. The signal modulated at the second frequency is emitted by the fourth antenna 170 as radio waves to the inside of the building. As a result, a signal contained in radio waves for use in 5G can be utilized in a wireless communication environment such as indoor Wi-Fi.

Although the foregoing description has taken an inward path (signal transmission from the outside to the inside of the building) as an example, the same applies to an outward path (signal transmission from the inside to the outside of the building). That is, the signal modulated at the second frequency and received by the fourth antenna 170 is demodulated by the second demodulation device 160a. The signal thus demodulated is modulated at the first frequency by the first modulation device 150b and transmitted to the second antenna 130. The second antenna 130 transmits radio waves containing the signal thus received toward the outside of the building. The first antenna 120 receives via the windowpane 110 the radio waves transmitted from the second antenna 130 and transmits the radio waves to the third antenna 140. The signal modulated at the first frequency is emitted by the third antenna 140 as radio waves to the outside of the building.

With a pair of antennas fixed to a windowpane, the signal transmission device 100 can transmit a high-frequency modulated signal for use in 5G to the inside of a building. The signal transmission device 100 of the present embodiment can stably supply even a high-frequency modulated signal to the inside of a building. That is, the signal transmission device 100 can provide a stable wireless communication environment indoors. Further, in the case of the present embodiment, it is only necessary to place antennas as members outside a building. This makes it only necessary to adapt only the antenna section to an external environment and brings about an advantage of making mounting of a product simple.

Furthermore, in the present embodiment, a modulated signal of a frequency of not lower than several tens of gigahertz is transmitted to the inside of a building and then down-converted to a frequency that is usable in existing equipment. This makes it possible to build a stable wireless communication environment indoors.

Figure 4:
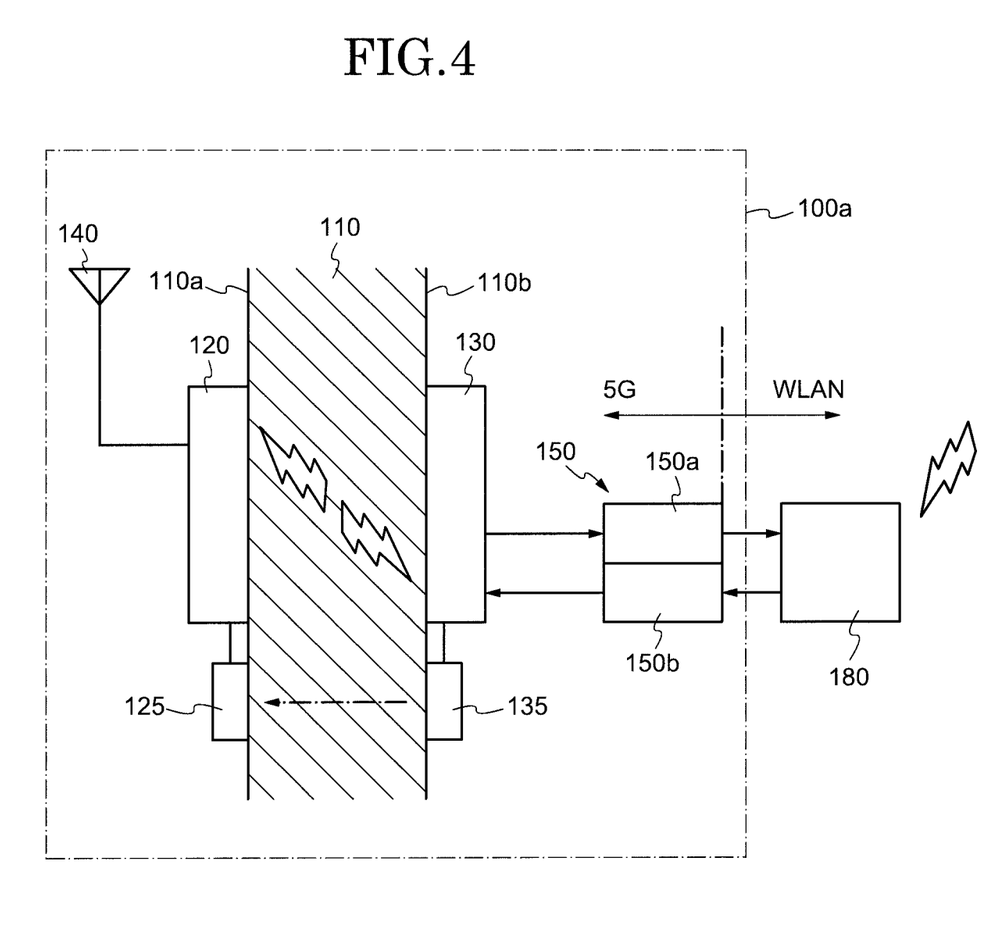
FIG. 4 is a diagram showing a configuration of a signal transmission device.

FIG. 4 is a diagram showing a configuration of a signal transmission device 100*a*. Specifically, the signal transmission device 100*a* is configured such that the second modulation and demodulation device 160 and the fourth antenna 170 are omitted from the signal transmission device 100. Instead, a wireless LAN router 180 that handles signals modulated at the second frequency, which is lower than the first frequency, is connected to the signal transmission device 100*a*. The wireless LAN router 180 may be a type with a built-in modem.

A signal modulated at the first frequency and transmitted by the signal transmission device 100*a* is demodulated by the first demodulation device 150*a* and converted to the original signal. The wireless LAN router 180 receives the original signal from the first demodulation device 150*a* and demodulates it at the second frequency. Then, the wireless LAN router 180 emits, to the inside of the building, radio waves containing the signal modulated at the second frequency.

In this way, the signal transmission device 100*a* of the present embodiment handles signals modulated at the first frequency. As a section that handles signals modulated at the second frequency, an existing configuration (such as a modem, an optical network unit, or a wireless LAN router) is used.

Modification 1

The embodiments have illustrated an example in which the third antenna 140 is used to received radio waves in the air and transmit radio waves into the air. However, the first antenna 120 may have both a function of receiving radio waves in the air and a function of transmitting radio waves into the air. In this case, the third antenna 140 can be omitted.

Modification 2

The embodiments have illustrated an example in which a signal is transmitted from the outside to the inside of a building (or from the inside to the outside of a building). However, this example is not intended to impose any limitation, and a configuration may be set up to handle only a case where a signal is transmitted from the outside to the inside of a building (or only a case where a signal is transmitted from the inside to the outside of a building). For example, in order solely to transmit radio waves from the outside to the inside of a building, it is only necessary to provide the first demodulation device 150*a* instead of the first modulation and demodulation device 150. On the other hand, in order solely to transmit radio waves from the inside to the outside of a building, it is only necessary to provide the first modulation device 150*b* instead of the first modulation and demodulation device 150.

Modification 3

The embodiments have illustrated an example in which the first antenna 120 is provided with the first power supply device 125 and the second antenna 130 is provided with the second feed device 135. However, at least either the first antenna 120 or the second antenna 130 needs only be provided with a power supply device. Such a configuration can be adopted in a case where only either the first antenna 120 or the second antenna 130 needs to be capable of beamforming. In this case, a configuration may be set up such that a power supply device is connected solely to the antenna that performs beamforming. Specifically, only the second antenna 130 may be supplied with electricity, and the second antenna 130 may perform beamforming. Further, when it is not particularly essential to supply electricity, both the first power supply device 125 and the second power supply device 135 may be omitted.

Further, embodiments have illustrated an example in the first power supply device 125 is wirelessly supplied with electricity from the second power supply device 135. However, this example is not intended to impose any limitation, and the first antenna 120 may be supplied with electricity by cable. In this case, a rail member that is capable of power supply is provided in any position on an outer wall or the like of the building. Moreover, a power supply coupled to the first antenna 120 needs only be rendered movable along the rail member. A usable example of such a rail member is a member called "slide outlet" or the like.

The embodiments have illustrated a configuration in which radio waves are transmitted and received via the windowpane 110. The present embodiment illustrates an example in which the windowpane 110 serves as a dielectric to form a capacitor. In the present embodiment, radio waves for use in 5G are transmitted to the inside of the building by utilizing such a characteristic that a signal of a higher frequency more easily passes through a capacitor. The present embodiment is described with a focus on points of difference from the first embodiment, and components that are common throughout the drawings are given the same reference signs and are not described below.

Figure 5:
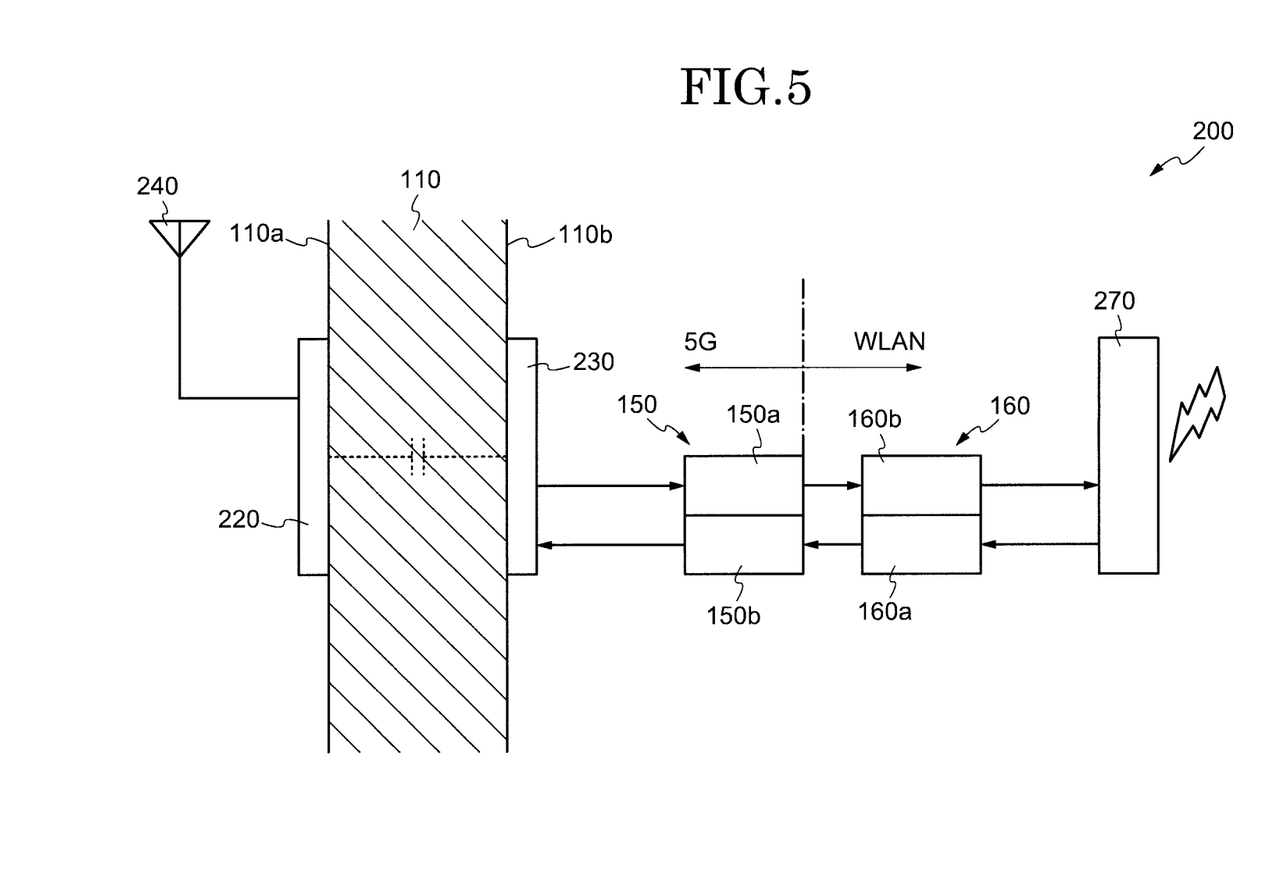
FIG. 5 is a diagram showing a configuration of a signal transmission device.

FIG. 5 is a diagram showing a configuration of a signal transmission device 200. The signal transmission device 200 differs from the signal transmission device 100 of FIG. 1 in that a first electrode 220 and a second electrode 230 are provided instead of the first antenna 120 and the second antenna 130. As shown in FIG. 5, the signal transmission device 200 is configured to include the first electrode 220 and the second electrode 230. The first electrode 220 and the second electrode 230 form a capacitor with the windowpane 110 sandwiched therebetween. In the present embodiment, a signal contained in radio waves received by an antenna 240 is transmitted to the first electrode 220. Alternatively, it is also possible to provide the first electrode 220 with a function as an antenna and omit the antenna 240.

The first electrode 220 and the second electrode 230 may be made of any material provided the material is a conductive material. For example, using silver, copper, or aluminum makes it possible to reduce a resistance component of the capacitor. Another usable example of a conductive material is a transparent conductive film made of a metallic oxide such as ITO (indium tin oxide). In this case, it is possible to form a capacitor without impairing the transparency of the windowpane 110. Another possible method is to place thin linear electrodes side by side at narrow intervals and cause them to function as an electrically surface electrode.

Figure 6A:
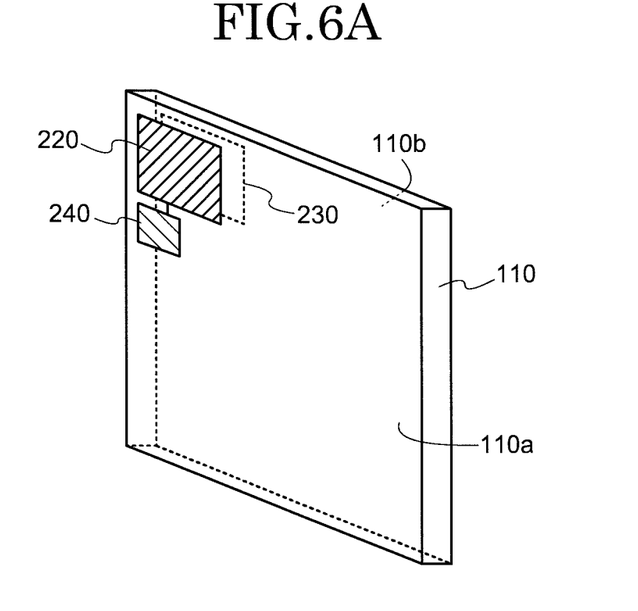
FIG. 6A is a diagram showing an example in which a first electrode and a second electrode are fixed to a windowpane.
Figure 6B:
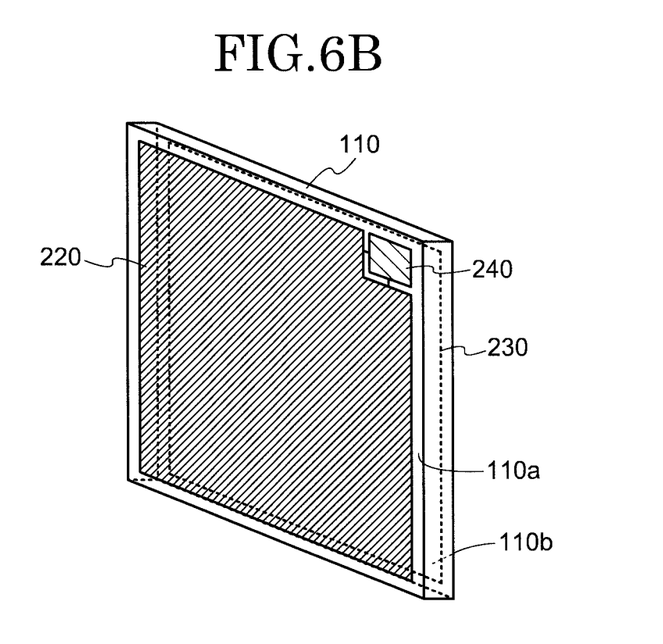
FIG. 6B is a diagram showing an example in which the first electrode and the second electrode are fixed to the windowpane.

FIGS. 6A and 6B are diagrams each showing an example in which the first electrode 220 and the second electrode 230 are fixed to the windowpane 110.

FIG. 6A illustrates an example in which the first electrode 220 and the second electrode 230 are made of a metal material, such as silver, copper, or aluminum, that has superior electrical conductivity. Since these metal materials have a light blocking effect, it is desirable that a capacitor be formed using some region of the windowpane 110. In this case, the first electrode 220 and the second electrode 230 are small in area. However, the use of a low-resistance metal material makes it possible to reduce an inductance component or impedance component of the capacitor.

As shown in FIG. 6A, in the present embodiment, the antenna 240 is fixed to the first surface 110a of the windowpane 110, too. For example, using a microstrip antenna as the antenna 240 makes it possible to place the antenna 240 near the first electrode 220. In this way, as shown in FIG. 6A, the windowpane 110 includes the antenna 240 and the first antenna 220 on the first surface 110a. Further, the windowpane 110 includes the second electrode 230, which faces the first electrode 220, on the second surface 110b, which is opposite to the first surface 110a.

FIG. 6B illustrates an example in which the first electrode 220 and the second electrode 230 are constituted by conductive films containing a metallic oxide such as ITO. In a case where the windowpane 110 serves as a dielectric, a transparent capacitor can be formed, as the conductive films containing a metallic oxide have transparency. Accordingly, the transparency of the windowpane 110 will not be impaired even if the areas of the first electrode 220 and the second electrode 230 occupy a large portion of the windowpane 110. In general, a metallic oxide is lower in electric conductivity than a metal. However, the use of a metallic oxide having transparency makes it possible to increase the area of the capacitor. Therefore, the use of a metallic oxide having transparency makes it possible to reduce an inductance component or impedance component of the capacitor. As shown in FIG. 6B, the antenna 240 is fixed to the first surface 110a of the windowpane 110, too, as in the case of FIG. 6A.

The first electrode 220 and the second electrode 230 may be fixed to the windowpane 110 with fixing members such as adhesives, pressure-sensitive adhesives, or magnets. In the case of the present embodiment, portions of the first electrode 220 and the second electrode 230 that face each other form the capacitor. Therefore, it can be said to be important to align the first electrode 220 and the second electrode 230 with each other. Accordingly, in the present embodiment, it is preferable that magnets be used as the fixing members so that spontaneous alignment can be attained by magnetic forces.

Further, in the present embodiment, the capacitor formed by the first electrode 220, the windowpane 110, and the second electrode 230 is used to allow passage of a signal modulated at the first frequency. In this case, the capacitor has its resonance frequency adjusted to be the first frequency. The resonance frequency of the capacitor needs only be adjusted by property values of the first electrode 220, the windowpane 110, and the second electrode 230. An adjustment may be made by adding a capacitance component, a resistance component, an inductance component, or the like by adding an auxiliary circuit or the like to the first electrode 220 or the second electrode 230.

A signal having passed through the capacitor formed by the first electrode 220, the windowpane 110, and the second electrode 230 is demodulated by the first demodulation device 150a. After that, the original signal thus demodulated is modulated at the second frequency by the second modulation device 160b and emitted from the antenna 270.

As noted above, the signal transmission device 200 is simply configured such that a pair of electrodes is fixed to a windowpane. This allows the signal transmission device 200 to transmit, to the inside of a building, a signal for use in 5G modulated at a high frequency. Accordingly, the signal transmission device 200 can stably supply even a signal modulated at a high frequency to the inside of a building.

Further, the signal transmission device 200 can provide a stable wireless communication environment indoors.

Furthermore, in the present embodiment, a modulated signal of a frequency of not lower than several tens of gigahertz is transmitted to the inside of a building and then down-converted to a frequency that is usable in existing equipment. This allows the signal transmission device 200 to build a stable wireless communication environment indoors.

Modifications 1 and 2 can also be applied to the signal transmission device 200. That is, the antenna 240 may be omitted, and only either the first demodulation device 150a or the first modulation device 150b may be provided. Further, the second modulation and demodulation device 160 and the antenna 270 may be omitted from the signal transmission device 200. That is, the signal transmission device 200 may be constituted by a section that handles signals modulated at the first frequency. For example, the first electrode 220, the second electrode 230, and the first modulation and demodulation device 150 are equivalent to the section that handles signals modulated at the first frequency.

The embodiments have illustrated a configuration in which a modulated signal of the first frequency received outside a building is transmitted to the inside of the building with the first frequency kept intact. On the other hand, in the present embodiment illustrates an example in which a frequency conversion is carried out outside a building and a signal modulated at the second frequency is transmitted to the inside of the building. The present embodiment is described with a focus on points of difference from the previous embodiments, and components that are common throughout the drawings are given the same reference signs and are not described below.

Figure 7:
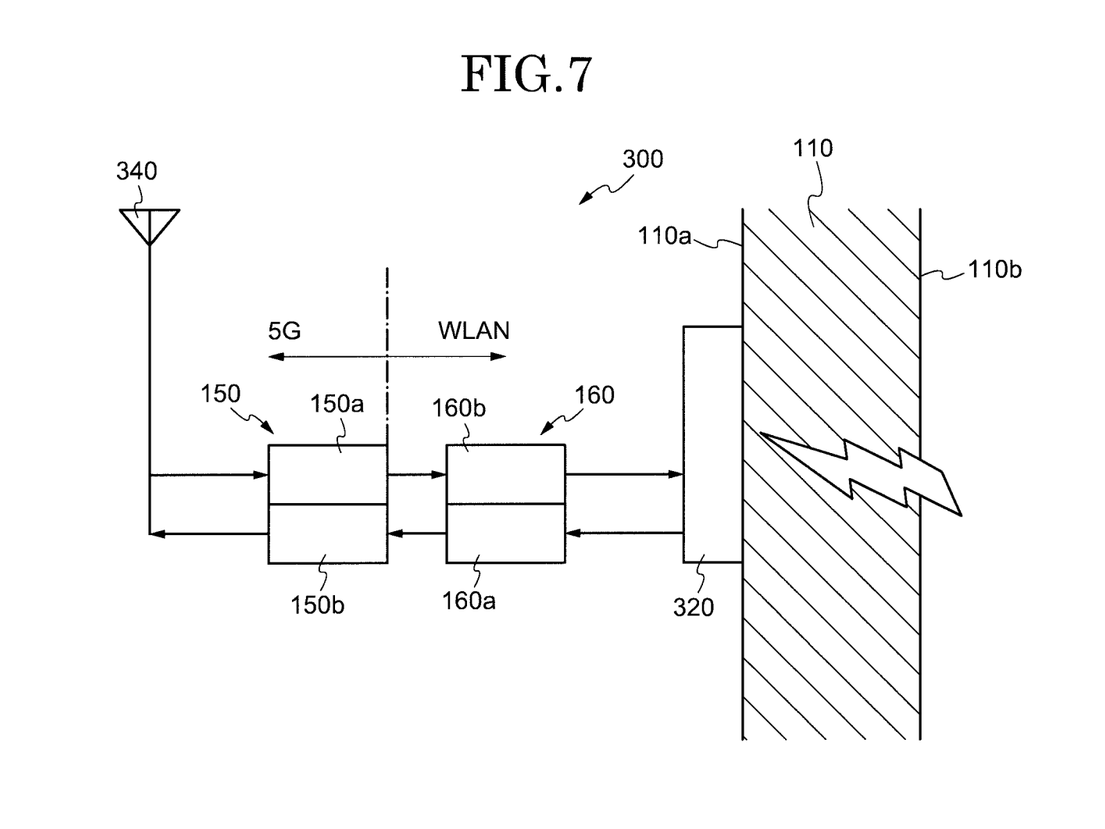
FIG. 7 is a diagram showing a configuration of a signal transmission device.

FIG. 7 is a diagram showing a configuration of a signal transmission device 300. The signal transmission device 300 differs from the signal transmission device 100 of FIG. 1 in that the first modulation and demodulation device 150 and the second modulation and demodulation device 160 are placed outside the building. That is, in the present embodiment, the first modulation and demodulation device 150 and the second modulation and demodulation device 160 are placed on the first surface 110a of the windowpane 110. In the present embodiment, an antenna 340 is connected to the first modulation and demodulation device 150. Further, an antenna 320 fixed to the first surface 110a of the windowpane 110 is connected to the second modulation and demodulation device 160.

Radio waves containing a signal modulated at the first frequency (e.g. 28 GHz) are received by the antenna 340 and transmitted to the first demodulation device 150a. The signal thus transmitted is demodulated by the first demodulation device 150a into the original signal, which is then transmitted to the second modulation device 160b. The original signal is down-converted by the second modulation device 160b to the second frequency (e.g. 2.4 GHz), which is lower than the first frequency. The signal subjected to the down-conversion is emitted as radio waves from the antenna 320.

At this point in time, the radio waves emitted from the antenna 320 are comparatively low in frequency and can therefore pass through the windowpane 110 without any difficulty. That is, the signal transmission device 300 converts radio waves for use in 5G outside a building to a low frequency that is usable in existing equipment. After that, the signal transmission device 300 transmits, to the inside of the building, low-frequency radio waves subjected to the conversion. This allows the signal transmission device 300 to stably supply a signal modulated at a high frequency to the inside of a building. Further, the signal transmission device 300 can provide a stable wireless communication environment indoors.

The present embodiment illustrates an example in which a pair of antennas or a pair of electrodes is fixed to a windowpane by a method which is different from those previous embodiments.

Figure 8:
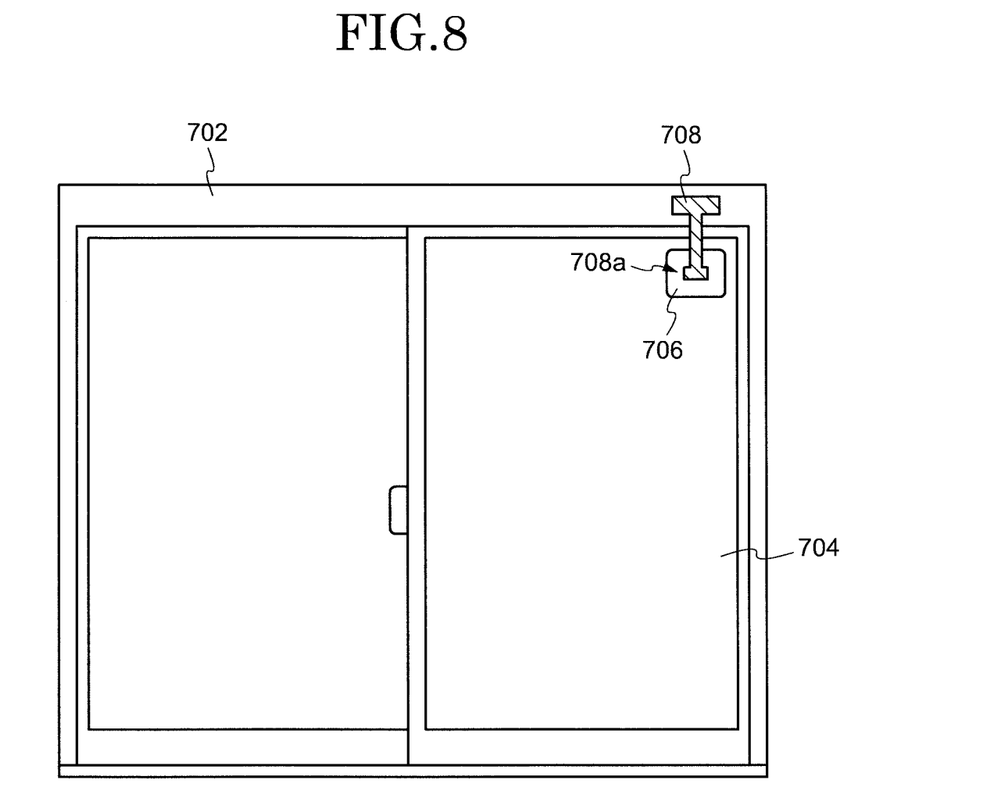
FIG. 8 is a diagram showing an example of a fixing member.

FIG. 8 is a diagram showing an example of a fixing member 708. In FIG. 8, a windowpane 704 is fitted in a window frame 702 of a building. In the present embodiment, the fixing member 708, fixed to the window frame 702, is used as an auxiliary member in fixing an antenna 706 to the windowpane 704. The fixing member 708 is made, for example, of a metal material or a plastic material and couples the window frame 702 and the antenna 706 together. The antenna 706 is fixed to the windowpane 704 with a pressure-sensitive adhesive (not illustrated). In this case, it is preferable that a coupling part 708*a* coupling the fixing member 708 and the antenna 706 together be separable. This makes it possible to open the windowpane 704 by separating the fixing member 708 and the antenna 706 from each other.

The fixing member 708 needs only be selected as appropriate according to a material of which the window frame 702 is made. For example, when the window frame 702 is made of a magnetic substance such as a ferromagnetic substance, the fixing member 708 can be fixed with a magnet. Alternatively, when the window frame 702 is made of wood, the fixing member 708 can be fixed with a fastening device such as a nail or a screw. Alternatively, when an adhesive is used as the fixing member 708, the fixing member 708 can be fixed regardless of what material the window frame 702 is made of.

As is the case with the previous embodiments, the present embodiment has illustrated an example in which the antenna 706 is fixed to the windowpane 704. However, this example is not intended to impose any limitation, since the present embodiment can also be applied to a case where an electrode is fixed to the windowpane 704.

The previous embodiments have been described by taking a house as an example of a building and taking a windowpane as an example of a non-metal portion. However, the signal transmission device 100, 100*a*, 200, or 300 of each embodiment may also be applied to a non-metal portion of a movable body such as a vehicle, a train, or an aircraft.

Figure 9A:
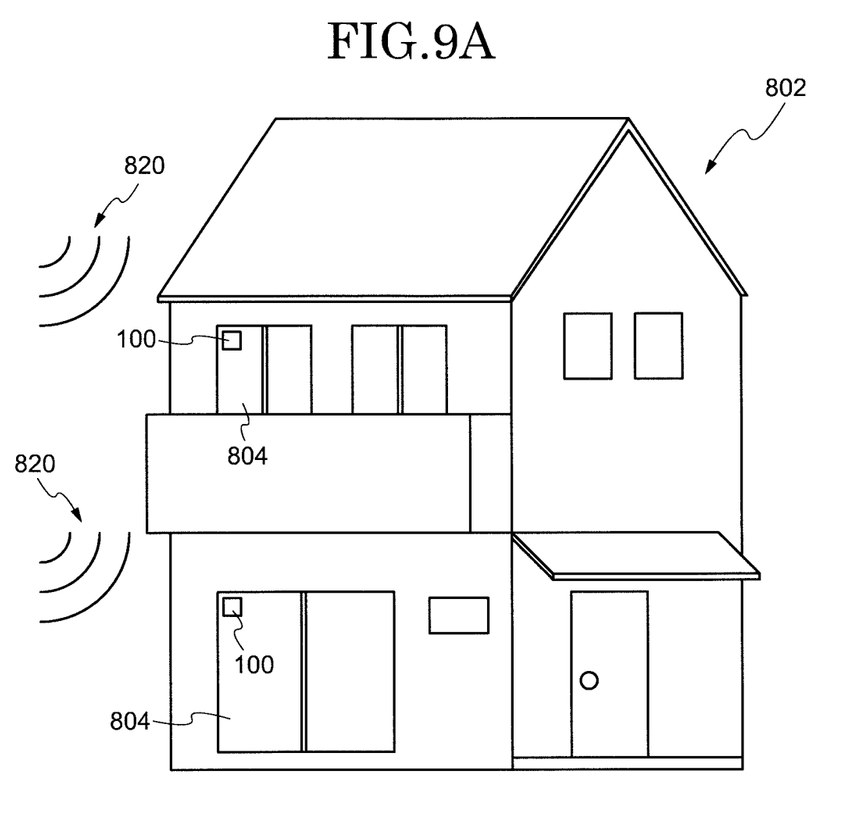
FIG. 9A is a diagram showing an example of application of a signal transmission device.
Figure 9B:
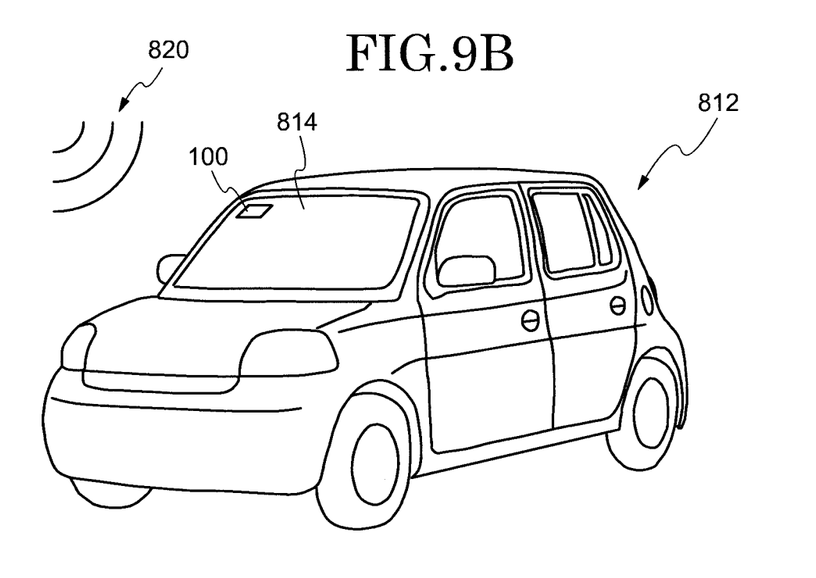
FIG. 9B is a diagram showing an example of application of the signal transmission device.

FIGS. 9A and 9B are diagrams each showing an example of application of a signal transmission device to a building or a movable body. Specifically, FIG. 9A illustrates an example in which the signal transmission device 100 is applied to a windowpane 804 of a house 802. That is, radio waves 820 are received outside the house 802, and a signal is transmitted to the inside of the house 802 via the windowpane 804. Further, FIG. 9B illustrates an example in which the signal transmission device 100 is applied to a windshield 814 of a vehicle 821. That is, radio waves 820 are received outside the vehicle 812, and a signal is transmitted to the inside of the vehicle 812 via the windshield 814. Application to a movable body is especially suitable in a case where a free Wi-Fi service is provided on board as in the case of an airport limousine. The present invention makes it possible to provide a stable wireless communication environment inside the house 802 or the vehicle 812 by means of a simple configuration.

The present embodiment has illustrated an example of application of the signal transmission device 100 to the house 802 or the vehicle 812. However, it is apparent that a signal transmission device of another embodiment is applicable, too.

Additions, deletions, or design variations of constituent elements or additions, omissions, or condition alterations of steps by persons skilled in the art on the basis of the configurations described as embodiments of the present invention are encompassed in the scope of the present invention provided they include the subject-matter of the present invention.

Even working effects which are different from those which are brought about by the aforementioned embodiments are construed as being duly brought about by the present invention provided such working effects are evident from the descriptions in the present specification or easily predictable by persons skilled in the art.

What is claimed is:

1. A signal transmission device comprising:
a first antenna transmitting radio waves containing a signal modulated at a first frequency;
a second antenna receiving the radio waves containing the signal from the first antenna via a pane of glass;
a demodulation device demodulating the signal and connected to the second antenna; and
a fixing member fixing the first antenna and the second antenna to the pane of glass, wherein
the fixing member includes a first magnet configured to fix the first antenna to the pane of glass and a second magnet configured to fix the second antenna to the pane of glass, and
the first magnet and the second magnet have opposite polarities relative to each other.

2. The signal transmission device according to claim 1, wherein at least the first antenna or the second antenna is a directional antenna.

3. The signal transmission device according to claim 2, wherein the directional antenna is a phased-array antenna.

4. The signal transmission device according to claim 1, wherein the first antenna and the second antenna are fixed face-to-face via the pane of glass.

5. The signal transmission device according to claim 1, wherein the first antenna and the second antenna are detachably fixed to the pane of glass.

6. The signal transmission device according to claim 1, further comprising: a modulation device modulating the signal at a second frequency that is lower than the first frequency and connected to the demodulation device.

7. The signal transmission device according to claim 1, further comprising: a third antenna receiving the radio waves containing the signal and connected to the first antenna.

8. The signal transmission device according to claim 1, further comprising: a power supply device connected to at least the first antenna or the second antenna.

9. A signal transmission device comprising:
an antenna receiving radio waves containing a signal modulated at a first frequency;
a first electrode connected to the antenna;
a second electrode;
a demodulation device modulating the signal and connected to the second electrode; and
a fixing member fixing the first electrode and the second electrode to a pane of glass, wherein
the first electrode and the second electrode are composed of a transparent conductive material constituted by transparent conductive films.

10. The signal transmission device according to claim 9, wherein the first electrode and the second electrode are fixed face-to-face via the pane of glass.

11. The signal transmission device according to claim 9, wherein the fixing member includes a magnet.

12. The signal transmission device according to claim 9, further comprising: a modulation device modulating the signal at a second frequency that is lower than the first frequency and connected to the demodulation device.

13. The signal transmission device according to claim 9, wherein the first electrode and the second electrode cover almost all of the pane of glass.

14. A windowpane comprising:
   a first antenna receiving radio waves containing a signal modulated at a first frequency on a first surface;
   a first electrode connected to the first antenna on the first surface; and
   a second electrode facing the first electrode on a second surface opposite to the first surface, wherein
      the first electrode and the second electrode are composed of a transparent conductive material constituted by transparent conductive films.

15. The windowpane according to claim 14, wherein the first electrode and the second electrode are fixed by a fixing member.

16. The windowpane according to claim 15, wherein the fixing member includes a magnet.

17. The windowpane according to claim 14, wherein the first electrode and the second electrode cover almost all of a pane of glass.

* * * * *